May 14, 1963  A. B. HAMM  3,089,156
MARKING BUOY
Filed April 3, 1961
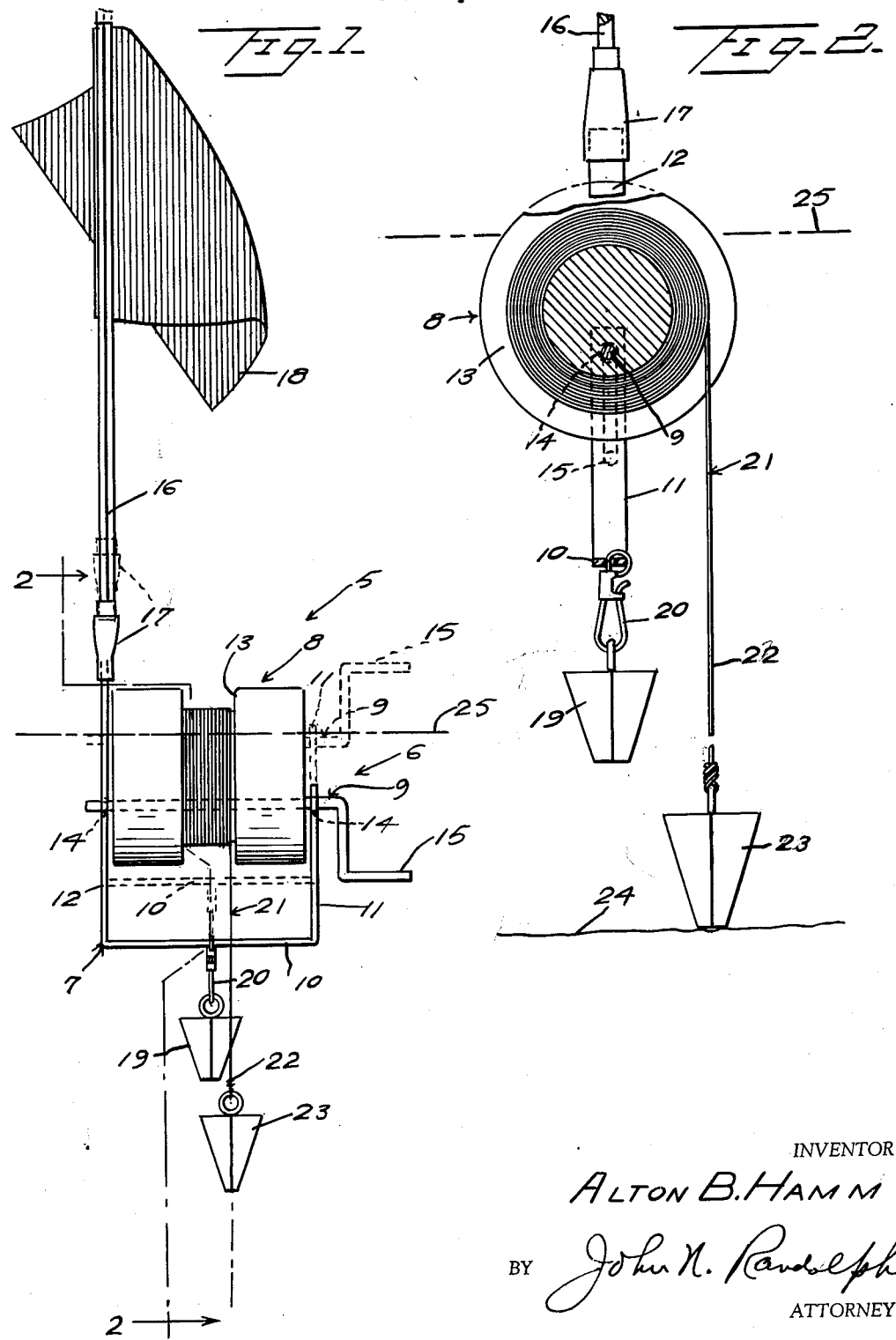
INVENTOR
ALTON B. HAMM
BY John N. Randolph
ATTORNEY United States Patent Office 3,089,156
Patented May 14, 1963

3,089,156
MARKING BUOY
Alton B. Hamm, Fort Worth, Tex., assignor of one-half to Acey B. Hamm, Fort Worth, Tex.
Filed Apr. 3, 1961, Ser. No. 100,248
5 Claims. (Cl. 9—9)

This invention relates to a marking buoy adapted for use by boatmen and fishermen for marking the approximate location of sunken objects, inadvertently lost overboard, to facilitate locating and retrieving such objects; and which may also be utilized for other purposes such as for marking a fishing area where a strike has been had or a catch made.

More particularly, it is an object of the present invention to provide a marking buoy including a windlass on which a line is wound and to which line an anchor is attached, so that when the buoy is thrown overboard, the gravitational pull exerted by the anchor on the line will cause the line to unwind from the windlass drum or spool until the anchor comes to rest on the bottom.

Another object of the invention is to provide a drum which is eccentrically mounted in the frame and wherein either the frame or drum is of a buoyant material while the other part is of a nonbuoyant material, so that the drum will be held against rotation when the anchor is resting on the bottom and the windlass will be maintained afloat and substantially directly above the anchor.

Still a further object of the invention is to provide a marking buoy including a windlass having a frame and a drum journaled in said frame, wherein either the drum or frame is formed of a buoyant material capable of supporting the windlass afloat including the other nonbuoyant part thereof.

Various other objects and advantages of the invention will hereinafter become more fully apparent from the following description of the drawing, illustrating a presently preferred embodiment thereof, and wherein:

FIGURE 1 is a side elevational view of a preferred form of the marking buoy, and FIGURE 2 is an enlarged fragmentary sectional view thereof, partly broken away, taken substantially along the line 2—2 of FIGURE 1.

Referring more specifically to the drawing, the marking buoy in its entirety is designated generally 5 and includes a windlass 6 which is composed of a frame 7, a drum or spool 8 and a shaft 9.

The frame 7 is substantially U-shaped, as seen in FIGURE 1, and includes an intermediate portion 10 and legs 11 and 12 which extend from the ends of said intermediate portion and which are disposed substantially parallel to one another.

In the embodiment as disclosed, the drum or spool 8 is illustrated as being solid and of cylindrical shape and is provided with an annular outwardly opening groove 13 which is spaced from the ends of the drum 8. The drum 8 may be formed of a synthetic material, such as foamed styrene, which has a very low density and is therefore very buoyant. However, the drum 8 may be formed of any other buoyant material and may be either solid or hollow. The shaft 9 extends eccentrically through and is secured in the drum 8 and has portions which are journaled in aligned openings 14 of the frame legs 11 and 12. The end of the shaft 9 which is disposed outwardly with respect to the leg 11 terminates in a crank 15 which can be manually actuated for revolving the drum 8 in the frame 7.

The leg 12 extends upwardly to above the uppermost portion of the drum 8, as seen in FIGURE 1, and the lower end of a flagstaff 16 is attached to the upper end of the leg 12 by a coupling 17 which supports the flagstaff 16 as a substantially straight extension of the leg 12.

A flag 18 of any desired size, shape, and/or color, is attached in any conventional manner to the upper portion of the flagstaff 16.

A weight 19 is attached as by means of a fastening 20 to the frame portion 10, approximately midway of the legs 11 and 12, and is suspended therebeneath for maintaining the frame 7 and the flagstaff 16 in upright positions, as illustrated in the drawing. The frame 7 is likewise preferably formed of a nonbuoyant material, and in lieu of suspending the weight 19 therebeneath, the bottom portion 10 of the frame may be enlarged or otherwise weighted.

An anchor line 21 is wound in the grooved portion 13 of the drum 8 and has one end secured to said drum. The opposite end 22 of the anchor line 21 extends downwardly from the drum 8, on one side of the frame 7, and has an anchor 23 secured thereto.

The marking buoy 5, with the anchor line 21 wound in the drum groove 13, can be thrown overboard for marking the location of a sunken object lost overboard or the location of a favorable fishing area. When the marker 5 is thrown overboard, the weight of the anchor 23 will cause the drum 8 to revolve with the shaft 9 in the frame 7 until the anchor 23 comes to rest upon the bottom 24. The drum 8 possesses sufficient buoyancy to maintain the windlass afloat and the weight 19 at the bottom of the frame 7 maintains the frame and flagstaff 16 in upright positions. As the drum 8 rotates about its eccentric axis 9, while the anchor 23 is descending toward the bottom 24, due to the gravitational pull exerted by said anchor, the drum will turn clockwise as viewed in FIGURE 2. As the drum 8 rotates clockwise from its position of FIGURE 2 through a half revolution to position the major portion of the drum below rather than above the shaft 9, said shaft will be elevated from its full line to its dotted line position of FIGURE 1, and the frame 7 and flagstaff 16 will likewise be elevated to the same extent relative to the drum 8, which drum 8 will remain in substantially the same position with respect to the surface of the water, as indicated at 25. During the second half of the complete revolution of the drum 8 in a clockwise direction and back to its initial position of FIGURE 2, the frame 7 and flagstaff 16 will move downwardly with respect to said drum and the gravitational pull of said parts will augment the gravitational pull exerted by the anchor 23. However, during the first half of the complete rotation of the drum 8, the gravitational pull of the anchor 23 must overcome the gravitational pull exerted by the frame 7, including the weight 19 and the flag 16, 18, so that this half revolution will be at a lesser speed. When the anchor 23 comes to rest on the bottom 24, the weight of the frame 7 and flag 16, 18 will stop rotation of the drum 8 which will assume and remain in a position as seen in FIGURE 2, relative to the frame 7, and said drum would have to overcome the gravitational pull of the frame in order to make another half revolution clockwise from its position of FIGURE 2. Accordingly, the line 21 will be kept substantially taut from the anchor 23 which is resting on the bottom 24 to the drum 8, and the flag 16, 18 will be maintained in an upright position by the frame 7, so that said flag will be located almost directly above the anchor 23.

The crank 15 is manually actuated for rewinding the line 21 on the drum or spool 8 when the marking buoy 5 is retrieved from the water.

Various modifications and changes are contemplated and may be resorted to, without departing from the function or scope of the invention as hereinafter defined by the appended claims.

I claim as my invention:
1. A marking buoy comprising a windlass including a drum, a frame, means eccentrically journaling the drum in the frame, a line wound upon said drum and having one end extending therefrom, and an anchor secured to said end of the line, said frame being formed of a nonbuoyant material including a weighted bottom portion for maintaining said journal means thereabove, said drum being formed of a buoyant material capable of sustaining the windlass afloat in the water, and said anchor exerting a gravitational pull on the drum greater than the gravitational pull of said frame for causing the drum to revolve in the frame for unwinding the line therefrom.

2. A marking buoy as in claim 1, the weight of said frame preventing rotation of the drum after the anchor ceases to exert a gravitational pull on the line due to the anchor coming to rest upon the bottom of the body of water.

3. A marking buoy as in claim 1, and a flag attached to and extending upwardly from a part of said frame and maintained in an upright position above the drum by the weighted bottom portion of the frame.

4. A marking buoy comprising a windlass including a nonbuoyant part and a buoyant part, said buoyant part possessing sufficient buoyancy to maintain the windlass afloat, one of said parts comprising a windlass frame, the other of said parts comprising a drum, means eccentrically journaling the drum in said frame, a line secured to and wound on said drum and having an end extending therefrom, and an anchor secured to said end of the line, said anchor being capable of exerting sufficient gravitational pull on the line to revolve the drum in the frame when the windlass is afloat and the anchor is supported thereby.

5. A marking buoy as in claim 4, a flag connected to a part of said frame, and means for maintaining said frame part in an upright position for maintaining the flag above the windlass.

References Cited in the file of this patent
UNITED STATES PATENTS

| | | |
|---|---|---|
| 735,595 | Sato | Aug. 4, 1903 |
| 946,174 | Vroman et al. | Jan. 11, 1910 |
| 2,490,876 | Lewis et al. | Dec. 13, 1949 |
| 2,856,616 | Dodge | Oct. 21, 1958 |